US009418043B2

(12) United States Patent
Rasmusson et al.

(10) Patent No.: US 9,418,043 B2
(45) Date of Patent: Aug. 16, 2016

(54) DATA SPECULATION FOR ARRAY PROCESSORS

(71) Applicant: Sony Corporation, Tokyo (JP)

(72) Inventors: Jim Rasmusson, Vellinge (SE); Håkan Jonsson, Malmö (SE); Jonas Gustavsson, Iomma (SE); Anders Isberg, Lund (SE)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 14/385,953

(22) PCT Filed: Mar. 7, 2014

(86) PCT No.: PCT/IB2014/059535

§ 371 (c)(1),
(2) Date: Sep. 17, 2014

(87) PCT Pub. No.: WO2015/132635

PCT Pub. Date: Sep. 11, 2015

(65) Prior Publication Data

US 2015/0363356 A1 Dec. 17, 2015

(51) Int. Cl.
*G06F 9/30* (2006.01)
*G06F 15/80* (2006.01)
*G06F 9/38* (2006.01)

(52) U.S. Cl.
CPC .............. *G06F 15/80* (2013.01); *G06F 9/3832* (2013.01); *G06F 9/3887* (2013.01)

(58) Field of Classification Search
None
See application file for complete search history.

(56) References Cited

U.S. PATENT DOCUMENTS 6,691,222 B2 * 2/2004 Janik ..................... G06F 9/3836 712/218
2007/0271444 A1 11/2007 Gove
2012/0191957 A1 * 7/2012 Gonion ............... G06F 9/30036 712/222
2014/0181477 A1 * 6/2014 Vaidya ............... G06F 9/30018 712/208
2015/0143083 A1 * 5/2015 Le ....................... G06F 9/30018 712/205

OTHER PUBLICATIONS

International Search Report mailed Jul. 3, 2014 in re International Application No. PCT/IB2014/059535 filed Mar. 7, 2014.

Goldberg et al. "Genetic Algorithms and Machine Learning." Guest Editorial, Machine Learning 3, 1988, pp. 95-99, Kluwer Academic Publishers, The Netherlands.

David W. Wall. "Speculative Execution and Instruction-Level Parallelism." WRL Technical Note TN-42, Mar. 1994, pp. 1-19, Digital Western Research Laboratory, Palo Alto, CA.

* cited by examiner

*Primary Examiner* — Corey S Faherty
(74) *Attorney, Agent, or Firm* — Coats & Bennett, P.L.L.C.

(57) ABSTRACT

A method is disclosed of utilizing a plurality of Arithmetic Logic Units (ALUs) of an array processor. It is determined that a first quantity of the ALUs are scheduled to execute a function during a given processing cycle, with each ALU being scheduled to use a respective one of a plurality of selected input vectors as an input. It is also determined that a second quantity of the ALUs are not scheduled for use during the given processing cycle. A plurality of predicted future input vectors that differ from the plurality of selected input vectors are determined. The second quantity of ALUs are scheduled to execute the function during the given processing cycle using respective ones of the plurality of predicted future input vectors as inputs. After completion of the processing cycle, function outputs received from the first and second quantity of ALUs are cached.

15 Claims, 7 Drawing Sheets

DATA SPECULATION FOR ARRAY PROCESSORS

TECHNICAL FIELD

The present disclosure relates to data speculation, and more particularly relates to utilizing non-scheduled Arithmetic Logic Units (ALUs) of a computing device in connection with speculative input data during a processing cycle.

BACKGROUND

The term "Single Instruction Multiple Thread" refers to the simultaneous execution of the same processing code in many threads with different input data in each thread. SIMT techniques have been used for array processors, which are specifically designed to perform a similar operation repetitively on many inputs. For example, modern Graphics Processing Unit (GPU) array processors include hundreds or thousands of Arithmetic Logic Units (ALUs) that are each capable of computing a function using an input vector. By feeding different input vectors to different ALUs, a given function can be computed many times in one processing cycle over many inputs. As GPUs continue to grow more powerful, computer scientists have come to use GPUs, which typically handle computation only for computer graphics, to perform computation in applications traditionally handled by a CPU. This technique is known as "general-purpose computing on graphics processing units" (GPGPUs). However, during a given processing cycle, many available ALUs may not be utilized.

SUMMARY

According to one aspect of the present disclosure, a method of utilizing a plurality of Arithmetic Logic Units (ALUs) of an array processor is disclosed. It is determined that a first quantity of the ALUs are scheduled to execute a function during a given processing cycle, with each ALU being schedule 2002-158d to use a respective one of a plurality of selected input vectors as an input. It is also determined that a second quantity of the ALUs are not scheduled for use during the given processing cycle. A plurality of predicted future input vectors are determined that differ from the plurality of selected input vectors. The second quantity of ALUs are scheduled to execute the function during the given processing cycle using respective ones of the plurality of predicted future input vectors as inputs. After completion of the processing cycle, function outputs received from the first and second quantity of ALUs are cached.

According to another aspect of the present disclosure, a computing device is disclosed that is characterized by an array processor comprising a plurality of Arithmetic Logic Units (ALUs), and a processing circuit. The processing circuit may be external to, or located within, the array processor. The processing circuit is configured to determine that a first quantity of the ALUs are scheduled to execute a function during a given processing cycle, with each ALU being scheduled to use a respective one of a plurality of selected input vectors as an input. The processing circuit is also configured to determine that a second quantity of the ALUs are not scheduled for use during the given processing cycle. The processing circuit is also configured to determine a plurality of predicted future input vectors that differ from the plurality of selected input vectors, and schedule the second quantity of ALUs to execute the function during the given processing cycle using respective ones of the plurality of predicted future input vectors as inputs. The processing circuit is also configured to, after completion of the processing cycle, cache function outputs received from the first and second quantity of ALUs.

In some embodiments, the predicted future input vectors are determined randomly from a larger set of input vectors. In other embodiments, the predicted future input vectors are determined by applying one or more genetic algorithms to one or more previous input vectors that have been used as inputs for a given function in one or more previous processing cycles. Application of the one or more genetic algorithms may include use of a genetic crossover and/or application of a mutation operator, for example.

In one or more embodiments, the array processor includes a Graphics Processing Unit (GPU).

DETAILED DESCRIPTION

The present disclosure describes techniques for more efficiently utilizing computing resources by using unscheduled Arithmetic Logic Units (ALUs) of an array processor during a given processing cycle. Techniques for predicting future input vectors to be used as function inputs by those unscheduled ALUs are also disclosed. By speculating on what input vectors will be used in future processing cycles, a computing device can compute a cache of predicted output values for a function. Subsequently, if a request is made to execute the function using one of the speculated input vectors as an input, the function output can be retrieved from the cache instead of being recomputed. In one or more embodiments, the input vector prediction (or "speculation") is performed using one or more genetic algorithms. In other embodiments, the input vector prediction may be performed by randomly selecting input vectors from a set of possible input vectors, or by randomly generating input vectors.

Figure 1:
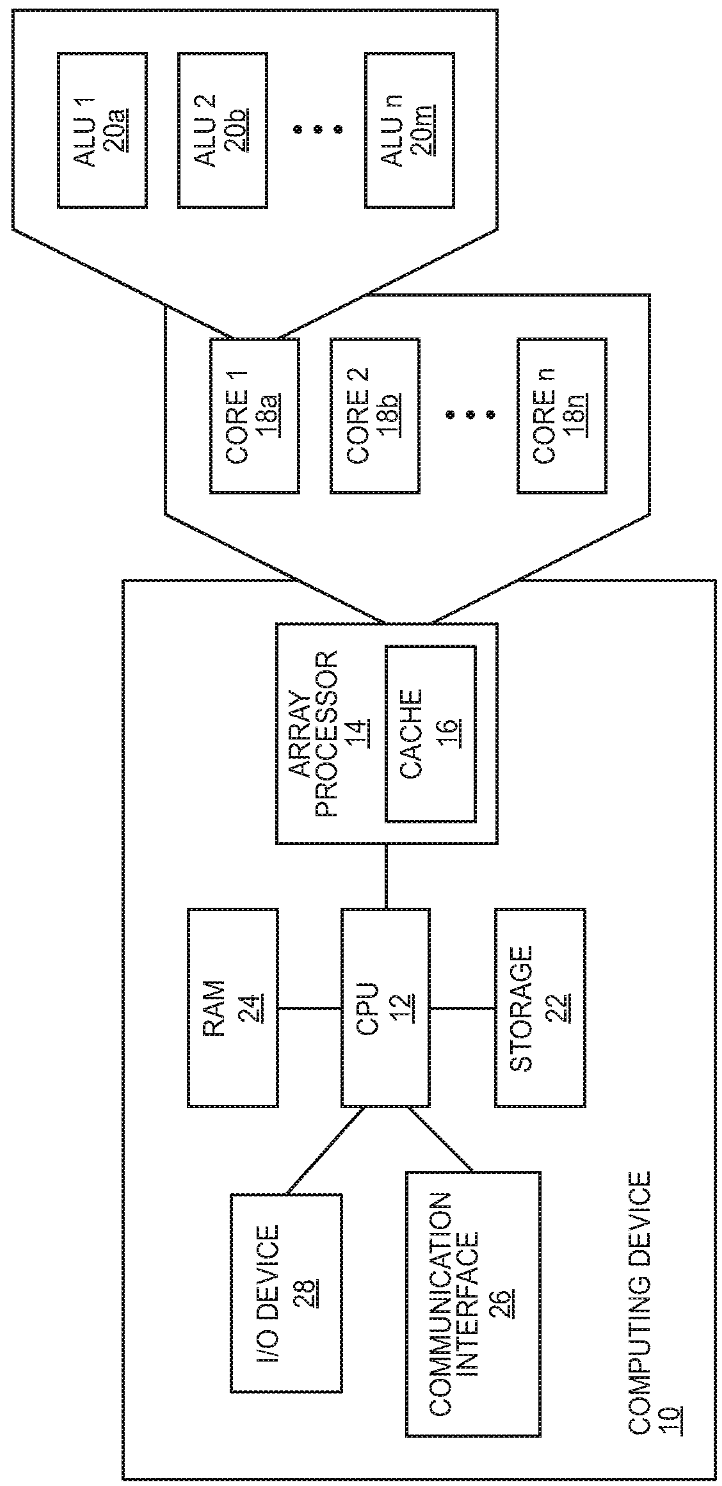
FIG. 1 schematically illustrates an example computing device that includes an array processor having a plurality of Arithmetic Logic Units (ALUs).

FIG. 1 schematically illustrates an example computing device 10 that includes both a primary central processing unit (CPU) 12 and an array processor 14. In one or more embodiments, the array processor 14 includes a Graphic Processing Unit (GPU). Of course, other array processors 14 could be used. Each of the CPU 12 and array process 14 include one or more processing circuits including, for example, one or more microprocessors, microcontrollers, Application Specific Integrated Circuits (ASICs), or the like configured with appropriate software and/or firmware to carry out one or more of the techniques discussed herein.

The computing device 10 includes a cache 16. Although the cache 16 is illustrated as being part of the array processor 14, it is understood that this is a non-limiting example, and that the cache 16 could be external to the array processor 14 (e.g., in storage 22 or RAM 24). The array processor includes a plurality of cores 18*a-n*, each of which includes a plurality of ALUs 20*a-m*. For simplicity, the ALUs of only core 18*a* are shown. However, is it understood that each of the cores 18*a-n* includes a plurality of ALUs 20. The cache 16 is configured to store outputs of the plurality of ALUs 20 of the array processor 14 for one or more functions. The computing device 10 also includes a computer readable storage medium (shown as storage 22), random access memory (RAM) 24, a communication interface 26 (e.g., a wireless transceiver), and one or more input/output devices 28 (e.g., an electronic display, a mouse, a touchscreen, a keypad, etc.). The storage 22 may comprise a solid state or optical hard drive, for example.

Figure 2:
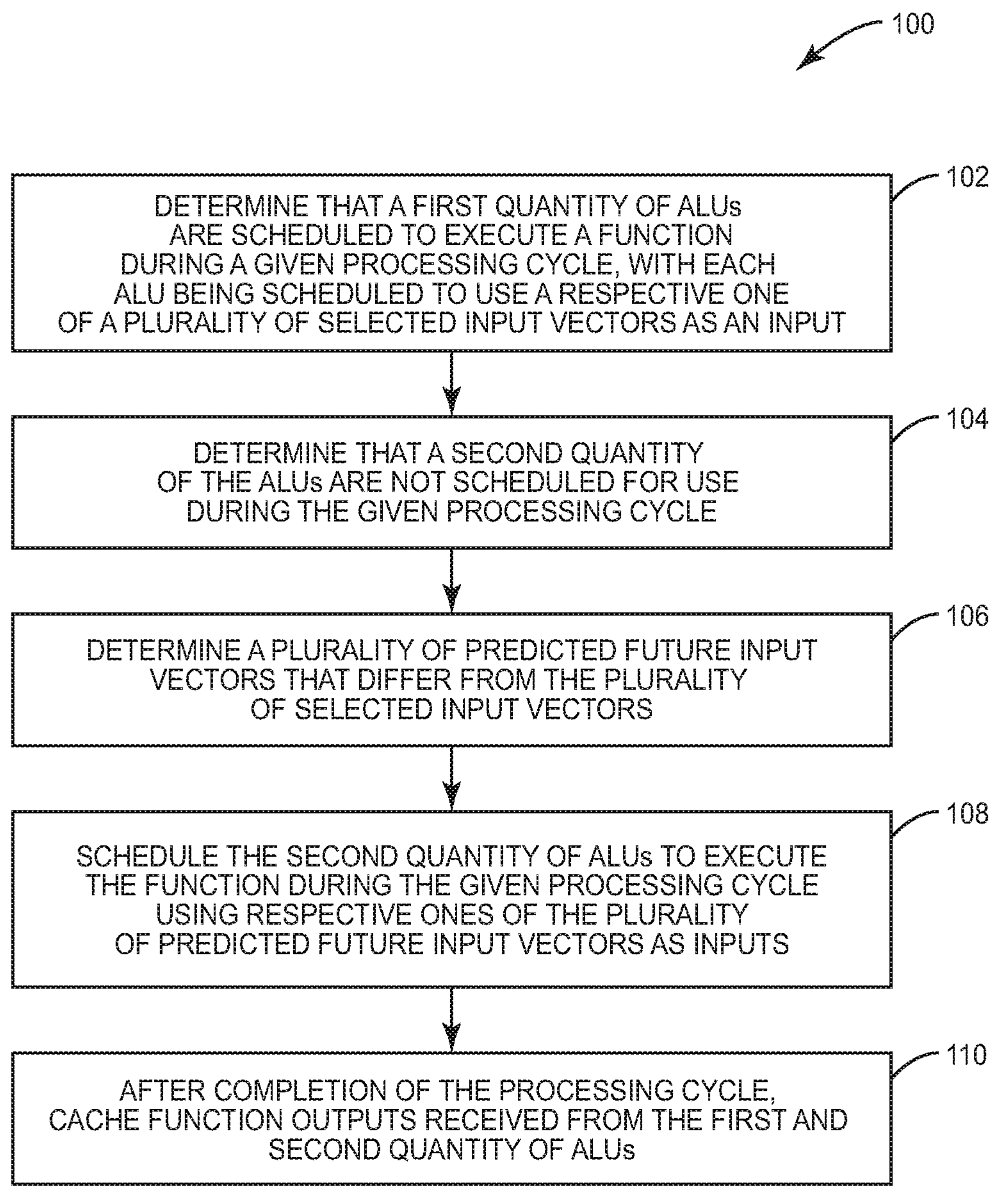
FIG. 2 illustrates an example method of utilizing the plurality of ALUs of FIG. 1.

FIG. 2 illustrates an example method 100 of utilizing the plurality of ALUs of an array processor (e.g., array processor 14 of computing device 10). The computing device 10 determines that a first quantity of the ALUs 20 are scheduled to execute a function during a given processing cycle (block 102), with each ALU being scheduled to use a respective one of a plurality of selected input vectors as an input. The computing device 10 also determines that a second quantity of the ALUs are not scheduled for use during the given processing cycle (block 104). The computing device 10 determines determining a plurality of predicted future input vectors that differ from the plurality of selected input vectors (block 106), and schedules the second quantity of ALUs 20 to execute the function during the given processing cycle using respective ones of the plurality of predicted future input vectors as inputs (block 108). After completion of the processing cycle, function outputs received from the first and second quantity of ALUs are cached ((block 110). The caching may occur in cache 16, for example.

Figure 3:
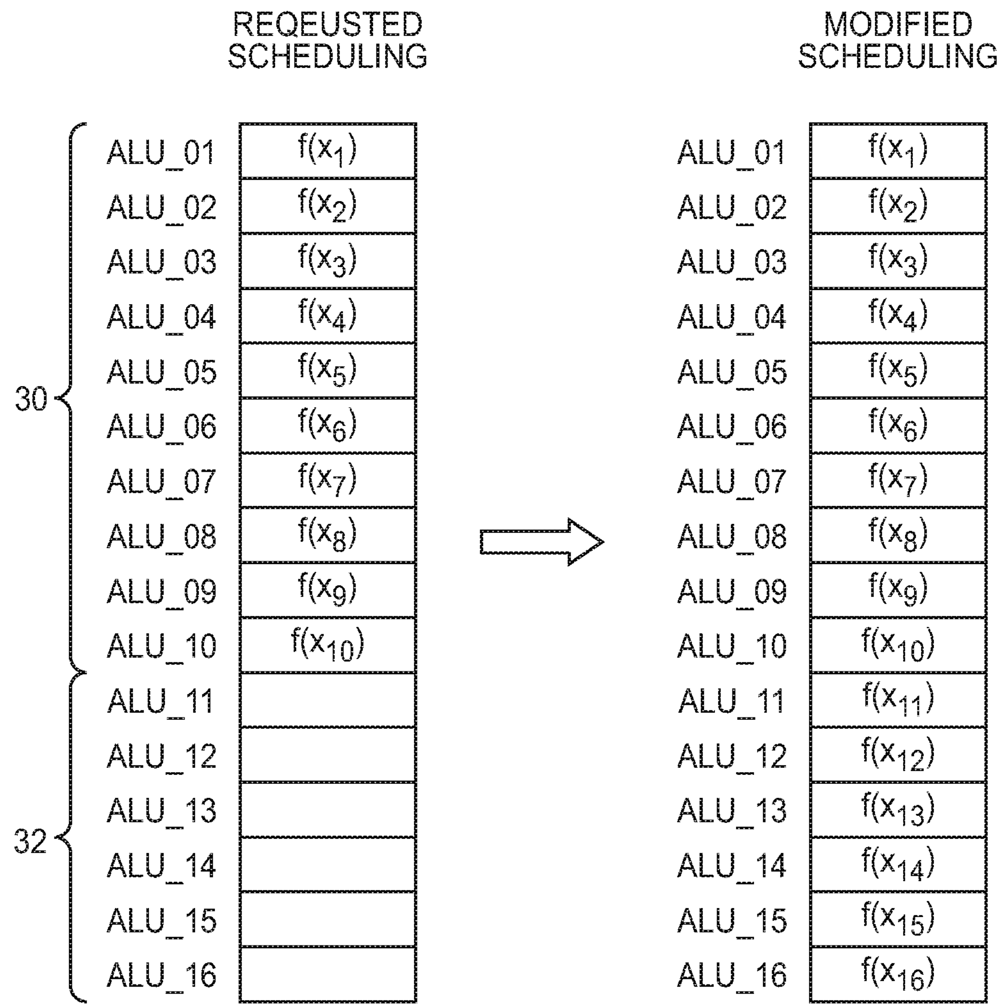
FIGS. 3-4 schematically illustrate examples of scheduling input vectors as function inputs in a plurality of ALUs.
Figure 4:
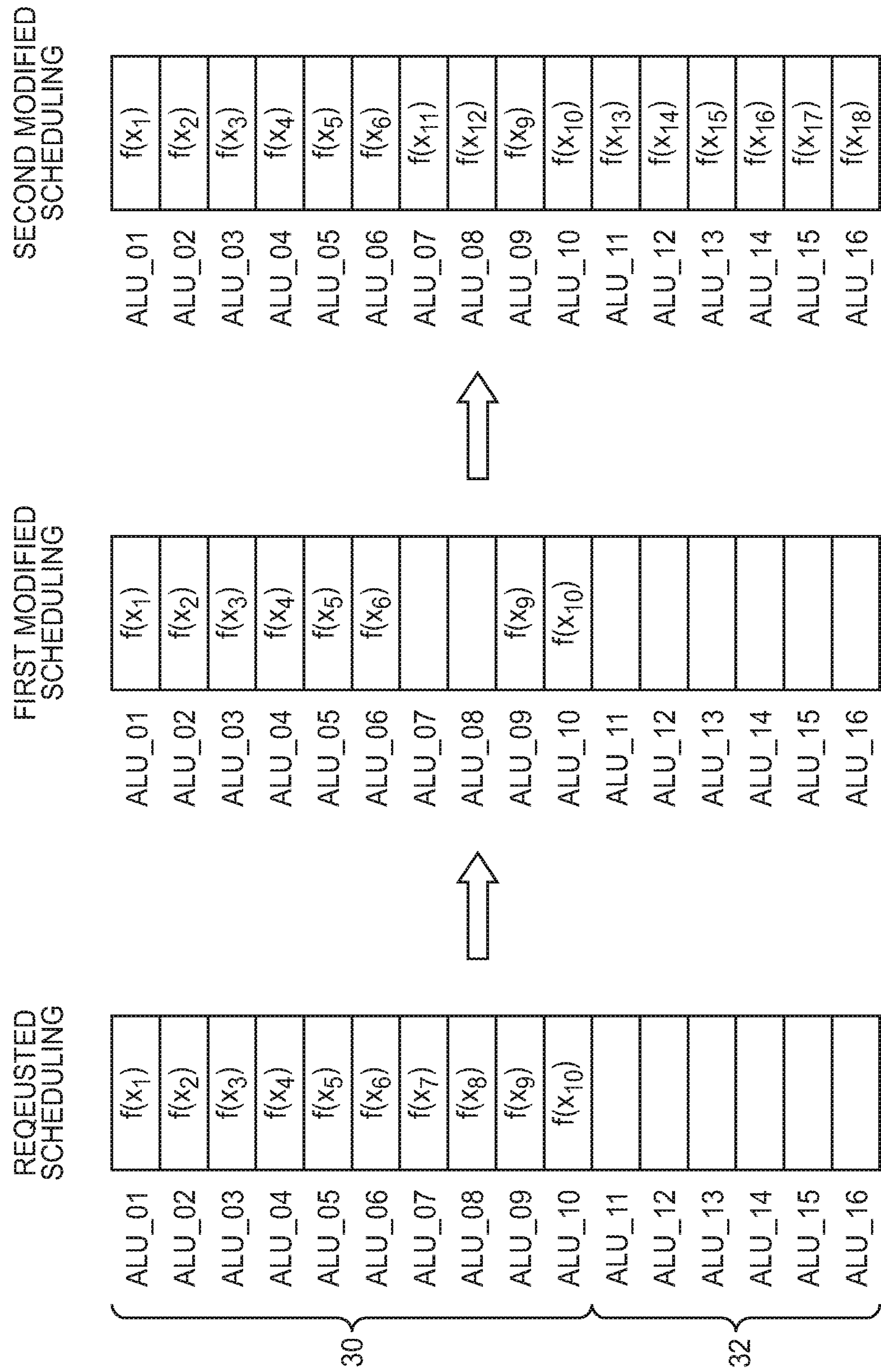

FIG. 3 provides an illustrative example application of the method 100. According to a requested scheduling for a given processing cycle (left side of FIG. 3), a first group 30 of ALUs are scheduled to compute a function $f$ using inputs vectors $x_1$-$x_{10}$, but a second group 32 of ALUs are not scheduled for use during the processing cycle. Predicted future input vectors $x_{11}$-$x_{16}$ are scheduled as inputs to the function $f$ for the group 32 of ALUs during the processing cycle according to a modified scheduling (right side of FIG. 3). After completion of the processing cycle, the function outputs of each ALU are cached. Of course, FIG. 3 assumes that the input vectors $x_1$-$x_{10}$ have not previously been used as function inputs, and therefore do not already have cached function outputs. FIG. 4 provides another illustrative example application of the method 100 in which some values are already cached.

Referring now to FIG. 4, according to a requested scheduling for a given processing cycle (left side of FIG. 4), a first group 30 of ALUs are requested to compute a function $f$ using input vectors $x_1$-$x_{10}$, but a second group 32 of ALUs are not scheduled for use during the processing cycle. It is then detected that input vectors $x_7$ and $x_8$ have previously been used as inputs for the function $f$ and already have function outputs that are cached. A first modified scheduling is shown in the middle of FIG. 4, in which ALU_07 and ALU_08 which would have been used to compute the function $f$ with input vectors $x_7$ and $x_8$ are determined to be available. Predicted future input vectors $x_{10}$-$x_{18}$ are scheduled as inputs to the function $f$ during the processing cycle for not only the group 32 of ALUs but also for ALU_07 and ALU_08 (right side of FIG. 4). After completion of the processing cycle, the function outputs of each ALU are cached.

Figure 5:
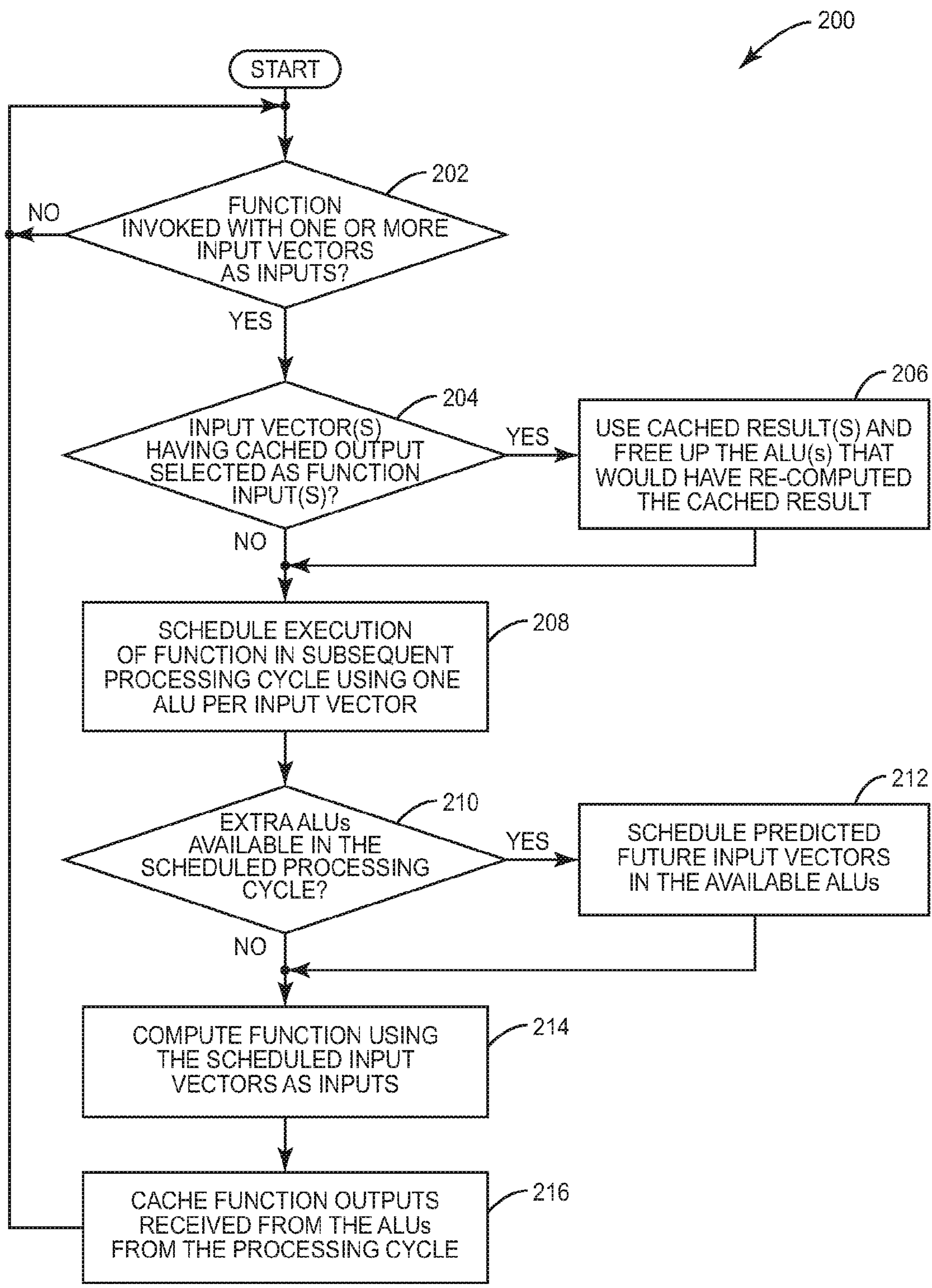
FIG. 5 illustrates an example implementation of a portion of the method of FIG. 2.

Referring now to FIG. 5, an example implementation 200 of a portion of the method 100 of FIG. 2 is shown. A function is invoked with one or more input vectors as an input (a "yes" to block 202). Computing device 10 then checks if any of the input vectors have cached results for the function (block 204). If any of the input vectors do have cached output results for the function (a "yes" to block 204), then those cached results are used and the one or more ALUs that would have recomputed the cached result are freed up (block 206).

The computing device 10 schedules execution of the function in a subsequent processing cycle using one ALU per input vector (block 208). If no extra ALUs are available in the scheduled processing cycle (a "no" to block 210), then the computing device computes the function using the scheduled input vectors as inputs (block 214), and caches the function outputs received from the ALUs from the processing cycle (block 216).

However, if extra ALUs are available in the scheduled processing cycle (a "yes" to block 210), then the computing device 10 schedules predicted future input vectors in the available ALUs (block 212), and then blocks 214-216 are performed. The use of the predicted future input vectors increases the odds that selected input vectors for the function in a future processing cycle will have cached outputs which can be returned from the cache instead of being recomputed.

In one or more embodiments, if the cache 16 becomes full, a cached input vector (and its corresponding function output) may be selected for replacement. In one or more embodiments, this selection is performed using a random sampling according to a distribution of fitness scores. The fitness scores are indicative of how many times the cached value has been returned from the cache. Thus, it may be desirable to replace cached entries with the lowest fitness scores, as they are less frequently used. Alternatively, it may be desirable to replace older cache entries with less or no emphasis on their fitness score.

The speculative future input vectors can be predicted in a number of ways. In some embodiments, the selected input vectors are part of a larger set of input vectors, and determining the plurality of predicted future input vectors that differ from the plurality of selected input vectors (block 106) is characterized by randomly selecting input vectors from the set of input vectors that have not yet been used as inputs to the function as the predicted input vectors. In some embodiments, they are randomly generated. In some embodiments, genetic algorithms are used to predict future input vectors.

Figure 6:
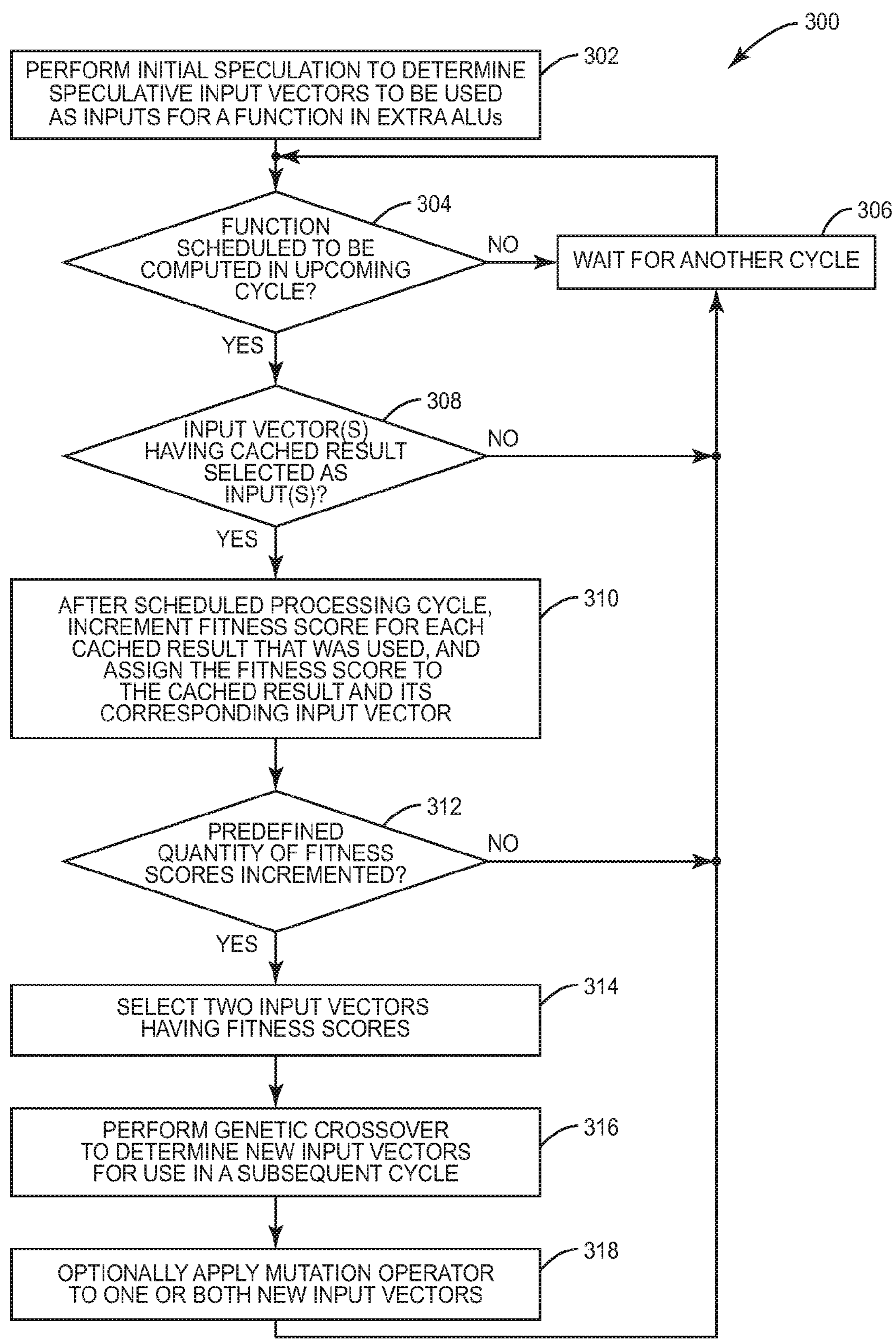
FIG. 6 illustrates an example implementation of a portion of the method of FIG. 2.

FIG. 6 illustrates an example implementation 300 of a portion of the method of FIG. 2 in which a genetic crossover is used to predict a future input vector. An initial speculation is performed to determine speculative input vectors to be used as inputs for a function in extra ALUs (block 302). A check is performed to determine if the function is scheduled to be computed in an upcoming processing cycle (block 304). If the function is not scheduled to be computed, the computing device 10 waits for another cycle (block 306). Otherwise, if the function is scheduled to be computed in an upcoming cycle (a "yes" to block 304), the computing device 10 determines if any of the selected input vectors selected as inputs have cached results for the function (block 308).

If any of the selected input vectors do have cached outputs, then after the scheduling processing cycle, the computing device 10 increments a fitness score for each of those cached results, and assigns the fitness score to the cached result and its corresponding input vector (block 310). If a predefined quantity of fitness scores have been incremented (a "yes" to block 312), then the computing device selects two input vectors having fitness scores (block 314), and performs a genetic crossover to determine two new input vectors to use as inputs for the function in a subsequent processing cycle (block 316). Optionally, the computing device applies a mutation operator to one or both of the new input vectors.

Referring again to block 314, in one or more embodiments the selection of the two input vectors having fitness scores is performed according to a distribution of the fitness scores of previous input vectors. This may include selecting two input vectors that have the two highest fitness scores, or selecting the two input vectors from a pool of input vectors at an uppermost region of the fitness value distribution (indicating that those input vectors have been requested as function outputs more than the other input vectors).

The procedure 300 of FIG. 6 will now be described in connection with a natural language processing example which utilizes a function $f(x, y, a, b, z)$ that may be used, for example, in bio-medicine applications for computing co-occurrences of characters in a string for different window sizes, and comparing those co-occurrences to a certain value. The variables of the function represent the following:

"x" is a string of characters;

"y" is a window size;

"a" is a first character to be used in a comparison;

"b" is a second character to be used in the comparison; and

"z" is a value that the number of co-occurrences is compared to.

Assume also that the function $f(x, y, a, b, z)$ takes all substrings "s" of "x" of size "y" and applies c(s, a, b)=1 if a and b occur in s, to them. That is, if both a and b appear in substring s then a 1 is determined. Otherwise, a 0 is determined. After summing the yielded values for each substring, the function $f$ compares them to the value z and asks if the comparison is true or false.

Assume that an input vector having the following elements is initially used:

x="ADCEADFEBACED"

y=3 a='A' b='C' z=4.

This may be shown in more traditional vector form as ("ADCEADFEBACED", 3, 'A', 'C', 4). This input vector is shown as 40 in FIG. 5. Plugging these values into the function $f$ can be represented with the expression below.

$$f(ADCEADFEBACED, 3, 'A', 'C', 4)$$

A first window of three characters (y=3) is analyzed, which corresponds to a first substring "ADC." Because 'A' and 'C' both appear in the substring "ADC" a 1 is yielded (see first "1" in parentheses below). The second substring of three characters if "DCE." Because "A" and "C" do not both appear in this substring, a 0 is yielded (see first "0" in parenthesis below). The third substring is "CEA." Because 'A' and 'C' both appear in this substring, a 1 is yielded (see second 1 in parenthesis below). This continues for each substring of three consecutive characters in the string x. Thus, the function $f$ when using the input vector 40 asks the following:

$$(1+0+1+0+0+0+0+0+1+0)>4?$$

This can be restated as asking whether 3>4 is true. Because this is not true, a 0 would be output by the function using the input vector above. The output value of 0 would be stored, along with the input vector, in cache 16.

When a computation of $f$ is to be performed for a given input vector, the computing device 10 checks the cache 16 to see if the function $f$ has already been computed for that input vector. If the desired output is cached, then the cached output result can be returned instead of recomputing $f$ with the input vector. Each time that this happens, the fitness score for the input vector is incremented. A cache entry that includes the input vector, its function output ("false"), and its fitness score ("1") is shown below.

(("*ADCEADFEBACED*", 3, '*A*', '*C*', 4), false, 1)

If use of the input vector for the function was requested again, the cached output would be returned again and the fitness score would be incremented once more (e.g., incremented by 1).

If the cache 16 becomes full, a cached input vector (and its corresponding output) individual may be selected for replacement (e.g., by random sampling according to a fitness distribution of fitness scores). Thus, cached entries with the lower (or the lowest) fitness scores may be replaced, as they are less frequently used.

If the array processor 14 is scheduled to compute a function during a given processing cycle, and an ALU of the array processor 14 is available during that processing cycle, a predicted future input value is scheduled (see block 108 of FIG. 2). This may include randomly selecting an input vector from a known set of possible input vectors, or may include randomly generating an input vector. For example, the input vector ("BDCEEDFEDACAD", 5,'D','C',2) may be randomly generated for use. This input vector is shown as 60 in FIG. 6.

One or more genetic algorithms may be applied to determine additional predicted future input vectors, such as a genetic crossover between two input vectors, or mutation of elements of a single input vector. An example of applying genetic crossover and mutation will now be discussed. Assume that each of the input vectors 40, 60 above has been used and therefore have a fitness score. Based on those fitness scores, the two input vectors 40, 60 are chosen for performing a genetic crossover.

Figure 7:
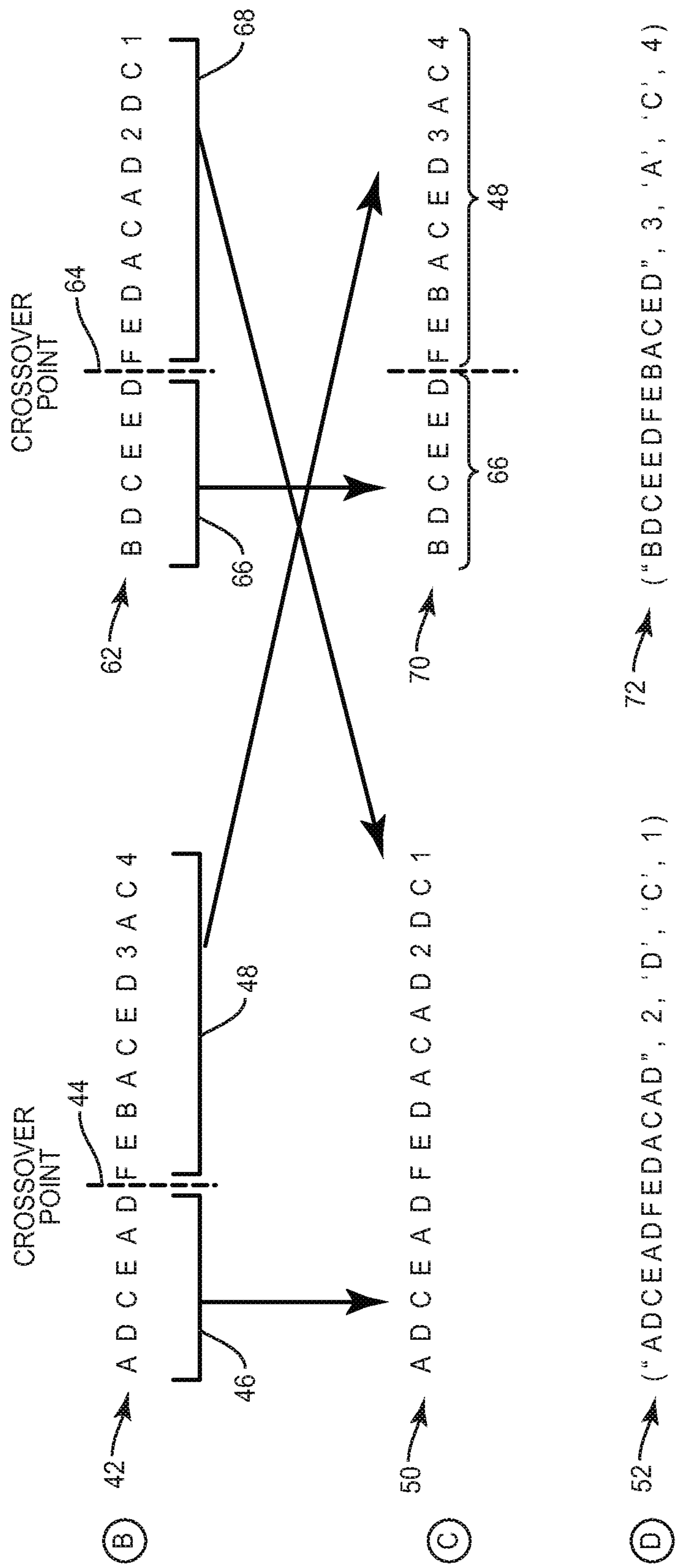
FIG. 7 illustrates an example application of a crossover algorithm to determine predicted future input vectors.

A genetic crossover of the input vectors 40, 60 is shown in FIG. 7. First, each input vector is concatenated to form strings 42, 62. Then a same crossover point is selected for each string. In the example of FIG. 7, a crossover point of 6 is randomly selected (see reference numerals 44, 64). Use of the crossover point 44 divides string 42 into substrings 46 and 48. Similarly, use of the crossover point 64 divides string 62 into substrings 66 and 68.

A crossover is then performed which swaps the substrings at their respective crossover points to produce new strings 50, 70. String 50 includes section 46 and 68, and string 70 includes sections 66 and 48. String 50 is then formatted as input vector 52, and string 70 is formatted as input vector 72. Each input vector 52, 72 is assigned a fitness score of 0. In one example, the fitness score is not assigned until after the input vectors 52, 72 are actually used as function inputs in a processing cycle.

Thus, in one some embodiments, determining the plurality of predicted future input vectors (block 106 of FIG. 2) includes selecting one or more previous input vectors that have been used as inputs for a given function in one or more processing cycles, and applying one or more genetic algorithms to the one or more previous input vectors to determine at least a portion of the plurality of predicted future input vectors. For example, genetic algorithms could be used do predict input vectors for some of the ALUs 32 of FIG. 3, and other input vectors could be predicted randomly.

Also, as discussed above, in some embodiments a fitness score may be used, with the fitness score being incremented for a given input vector each time that the input vector is selected as an input for a given function. In some such embodiments, the selection of one or more previous input vectors that have been used as inputs for the given function (block 314 of FIG. 6) is performed based on the fitness score of the previous input values.

In the example of FIG. 7, applying a genetic algorithm to the previous input vectors 40, 60, is characterized by performing a genetic crossover on the two previous input vectors 40, 60 to determine two different, new input vectors 52, 72. In the same, or other embodiments, applying a genetic algorithm is characterized by applying a mutation operator to one or more elements in the new input vectors 52, 72 (or to the previous input vectors 40, 60). Some example mutation operators include replacing a value of an element of an input vector with a random value, negating a value of an element of an input vector, increasing a value of an element of an input vector by a predefined amount, and decreasing a value of an element of an input vector by a predefined amount. For example, a mutation operator could be applied to the input vector 40 by changing the "3" in input vector 40 to a "2" which would change the output of the function $f$ discussed above.

Of course, it is understood that the examples discussed above are only non-limiting examples, and that a variety of other genetic algorithms that use the same or different genetic operators, cross-over points, and mutations could be applied. For example, some additional genetic algorithms could be used that include various combinations of the following genetic operators: negation, multi-point crossover, three parent crossover, and uniform crossover. As additional examples, some additional genetic operators that could be used also include those that work on the population level by dividing the population into subpopulations, for example regrouping, colonization-extinction, or migration. Because such genetic operators and genetic algorithms are known to those of ordinary skill in the art, they are not discussed in detail herein.

Performing data speculation as described above for many-core processors (or even single core processors having a plurality of ALUs) to determine predicted future input vectors, and then using the abundance of spare processing power on such computing devices to calculate function outputs with those input vectors, can be beneficial, because spare computing resources are utilized instead of being idle. Also, if the speculation is well-performed and the predicted future input vectors are requested as function inputs in the future, their values can quickly be returned from the cache instead of being recomputed. These techniques may be particularly useful for GPU array processors which have hundreds or thousands of ALUs available.

Also, although the computing device 10 of FIG. 1 has been mentioned in various examples above, it is understood that the computing device 10 of FIG. 1 is only a non-limiting example, and that other computing devices including array processors that have a plurality of ALUs could be used.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method of utilizing a plurality of Arithmetic Logic Units (ALUs) of an array processor comprising:

determining that a first quantity of the ALUs are scheduled to execute a function during a given processing cycle, with each ALU being scheduled to use a respective one of a plurality of selected input vectors as an input;

determining that a second quantity of the ALUs are not scheduled for use during the given processing cycle;

determining a plurality of predicted future input vectors that differ from the plurality of selected input vectors;

scheduling the second quantity of ALUs to execute the function during the given processing cycle using respective ones of the plurality of predicted future input vectors as inputs; and after completion of the processing cycle, caching function outputs received from the first and second quantity of ALUs.

2. The method of claim 1, wherein said determining the plurality of predicted future input vectors comprises:

selecting one or more previous input vectors that have been used as inputs for the function in one or more previous processing cycles; and applying one or more genetic algorithms to the one or more previous input vectors to determine at least a portion of the plurality of predicted future input vectors.

3. The method of claim 2, further comprising:

incrementing a fitness score for a given input vector each time that the input vector is selected as an input for the function;

wherein said selecting one or more previous input vectors that have been used as inputs for the function in one or more previous processing cycles is performed based the fitness scores of the previous input values.

4. The method of claim 2:

wherein applying one or more genetic algorithms to the one or more previous input vectors comprises performing a genetic crossover on two previous input vectors to determine two different, new input vectors.

5. The method of claim 4, further comprising applying a mutation operator to one or more elements in one or both of the new input vectors.

6. The method of claim 5, wherein the mutation operator comprises one of: replacing a value of an element of an input vector with a random value, negating a value of an element of an input vector; increasing a value of an element of an input vector by a predefined amount, and decreasing a value of an element of an input vector by a predefined amount.

7. The method of claim 1:

wherein the selected input vectors are part of a larger set of input vectors; and wherein determining the plurality of predicted future input vectors that differ from the plurality of selected input vectors comprises randomly selecting input vectors from the set of input vectors that have not yet been used as inputs to the function as the predicted input vectors.

8. A computing device comprising:

an array processor comprising a plurality of Arithmetic Logic Units (ALUs); and a processing circuit configured to:

determine that a first quantity of the ALUs are scheduled to execute a function during a given processing cycle, with each ALU being scheduled to use a respective one of a plurality of selected input vectors as an input;

determine that a second quantity of the ALUs are not scheduled for use during the given processing cycle;

determine a plurality of predicted future input vectors that differ from the plurality of selected input vectors;

schedule the second quantity of ALUs to execute the function during the given processing cycle using respective ones of the plurality of predicted future input vectors as inputs; and after completion of the processing cycle, cache function outputs received from the first and second quantity of ALUs.

9. The computing device of claim 8, wherein to determine the plurality of predicted future input vectors, the processing circuit is configured to:

select one or more previous input vectors that have been used as inputs for the function in one or more previous processing cycles; and apply one or more genetic algorithms to the one or more previous input vectors to determine at least a portion of the plurality of predicted future input vectors.

10. The computing device of claim 9, wherein the processing circuit is further configured to:

increment a fitness score for a given input vector each time that the input vector is selected as an input for the function;

wherein the selection of the one or more previous input vectors that have been used as inputs for the function in one or more previous processing cycles is performed based on the fitness score of the previous input values.

11. The computing device of claim 9:

wherein to apply one or more genetic algorithms to the one or more previous input vectors, the controller circuit is configured to perform a genetic crossover on two previous input vectors to determine two different, new input vectors.

12. The computing device of claim 11, wherein the processing circuit is further configured to apply a mutation operator to one or more elements in one or both of the new input vectors.

13. The computing device of claim 12, wherein the mutation operator comprises one of: replacing a value of an element of an input vector with a random value, negating a value of an element of an input vector; increasing a value of an element of an input vector by a predefined amount, and decreasing a value of an element of an input vector by a predefined amount.

14. The computing device of claim 8:

wherein the selected input vectors are part of a larger set of input vectors; and wherein to determine the plurality of predicted future input vectors that differ from the plurality of selected input vectors, the processing circuit is configured to randomly select input vectors from the set of input vectors that have not yet been used as inputs to the function as the predicted input vectors.

15. The computing device of claim 8, wherein the array processor includes a Graphics Processing Unit (GPU).

* * * * *